(12) United States Patent
Hermann

(10) Patent No.: US 7,532,608 B2
(45) Date of Patent: May 12, 2009

(54) ELECTRONIC ANTI-THEFT SYSTEM WITH CORRELATED TRANSMIT/RECEIVE ANTENNAS

(75) Inventor: Stefan Hermann, Köfering (DE)

(73) Assignee: Siemens Aktiengesellschaft, Munich (DE)

( * ) Notice: Subject to any disclaimer, the term of this patent is extended or adjusted under 35 U.S.C. 154(b) by 335 days.

(21) Appl. No.: 11/200,693

(22) Filed: Aug. 10, 2005

(65) Prior Publication Data

US 2006/0034243 A1    Feb. 16, 2006

(30) Foreign Application Priority Data

Aug. 10, 2004    (DE)    ......... 10 2004 038 837

(51) Int. Cl.
*H04J 1/00*    (2006.01)
(52) U.S. Cl. ............ 370/343; 370/342; 370/335; 370/345; 370/334
(58) Field of Classification Search ......... 370/343, 370/320, 342, 335, 278, 282, 334, 336, 345, 370/360, 367; 455/13.3, 24; 375/267; 340/426, 340/10.1, 573.1, 545.3; 343/702, 700
See application file for complete search history.

(56) References Cited

U.S. PATENT DOCUMENTS

| | | | |
|---|---|---|---|
| 5,552,641 A | | 9/1996 | Fischer et al. |
| 6,483,425 B1 * | | 11/2002 | Avenel ............ 340/5.61 |
| 6,762,686 B1 * | | 7/2004 | Tabe ............... 340/573.1 |
| 6,791,468 B2 | | 9/2004 | Stippler |
| 6,850,189 B2 | | 2/2005 | Ilg et al. |
| 2002/0018002 A1 | | 2/2002 | Stippler |
| 2002/0024429 A1 * | | 2/2002 | Kamlah ............ 340/426 |
| 2002/0163419 A1 | | 11/2002 | Ott |
| 2003/0117295 A1 | | 6/2003 | Okada |
| 2003/0151552 A1 | | 8/2003 | Ilq et al. |
| 2004/0032839 A1 * | | 2/2004 | Kaewell et al. ...... 370/320 |
| 2005/0151668 A1 * | | 7/2005 | Marty ............ 340/825.72 |
| 2005/0249303 A1 * | | 11/2005 | Takano ............ 375/267 |
| 2006/0109179 A1 * | | 5/2006 | Humpfer et al. ..... 343/700 MS |
| 2006/0152419 A1 * | | 7/2006 | Sato et al. ......... 343/702 |

FOREIGN PATENT DOCUMENTS

| | | |
|---|---|---|
| DE | 43 29 697 A1 | 3/1995 |
| DE | 195 42 441 C2 | 5/1997 |
| DE | 699 10 943 T2 | 5/2000 |
| DE | 100 04 161 A1 | 8/2001 |
| DE | 100 31 468 A1 | 1/2002 |
| DE | 101 14 876 A1 | 10/2002 |
| DE | EP 1325849 A2 * | 12/2002 |
| DE | 102 05 580 B4 | 9/2003 |
| EP | 1 001 117 B1 | 5/2000 |
| EP | 1 325 849 A2 | 7/2003 |
| GB | 2 307 378 A | 5/1997 |

* cited by examiner

*Primary Examiner*—Tan Trinh
(74) *Attorney, Agent, or Firm*—Laurence A. Greenberg; Werner H. Stemer; Ralph E. Locher

(57) ABSTRACT

An electronic anti-theft system and an operating method have transmit/receive antennas of different frequencies that are electrically correlated with one another. The data communication of access code signals takes place at least partially via shared signal paths. A frequency decoupling of the access code signals is also performed. The transmit/receive antennas are preferably also embodied as structurally integrated. In this way a substantial simplification of the system and simultaneously also a cost optimization can be achieved.

11 Claims, 1 Drawing Sheet

ELECTRONIC ANTI-THEFT SYSTEM WITH CORRELATED TRANSMIT/RECEIVE ANTENNAS

BACKGROUND OF THE INVENTION

Field of the Invention

The invention relates to a method for operating an electronic anti-theft system wherein, for the purposes of data communication, electromagnetic access code signals are transmitted and/or received via at least two transmit/receive antennas. The invention further relates to an electronic anti-theft system wherein, for the purpose of data communication, at least two transmit/receive antennas are provided for transmitting and/or receiving electromagnetic access code signals.

Although in principle they can be applied to any electronic anti-theft systems, the present invention and the problems it is intended to address will be described below in relation to an electronic anti-theft system in a motor vehicle. Anti-theft systems of this kind and methods for operating anti-theft systems of this kind are essentially known from the prior art.

German patent DE 195 42 441 C2 (corresponding to published U.K. patent application 2 307 378 A) describes an antenna device for an anti-theft system. The antenna device has a pair of transmit and receive coils that are disposed immediately adjacent to each other and are mechanically connected to each other, but are physically separate from each other, each of the coils forming an individual antenna. The two individual antennas are driven by the same control apparatus by sinusoidal signals so that each of the two individual antennas generates an electromagnetic signal with the same frequency, but the signals of the two individual antennas are emitted with a phase displacement between the signals. In the end this causes an oscillating electromagnetic field of the same frequency to be generated as a result of superimposition of the two individual signals.

Also provided in German patent DE 195 42 441 C2 (corresponding to U.K. patent application 2 307 378 A) is a further coil in the form of an energy coil that is embodied in a single piece with one of the individual antennas and is driven jointly with the individual antenna. There is therefore also an electrical connection between the individual antenna and the energy coil and the two coils generate electromagnetic fields of the same frequency and phase position. German patent DE 195 42 441 C2 also discloses that either low-frequency or high-frequency fields can be generated by the antennas, according to the configuration of the antennas on or in the vehicle as well as the desired range. The fact remains, however, that all the antennas always generate fields of the same frequency.

Basically, however, the antennas of the anti-theft system can be driven at different frequencies. In contrast, in the case of the generally known PASE system (PASE=Passive Start and Entry System), which is developed and marketed as an access control system for motor vehicles by the company Siemens VDO, a plurality of physically separate antennas with different configurations are provided. In this case, on the one hand antennas for the LF range in the frequency range of 50-125 kHz are provided in the form of air or magnetic core coils, and on the other hand antennas for the UHF range in the frequency range of 300-900 MHz are provided in the form of dipole or rod antennas. By use of these antennas, which are embodied differently in terms of their frequency range, radio links with different frequencies can be set up to a data medium, for example an active or passive transponder, which ultimately leads to better and more reliable data communication.

These systems typically make use of 4 to 8 LF antennas and 1 to 4 UHF antennas that are physically disposed at different points in the motor vehicle. The use of antennas that are physically separate from one another is intended to achieve an optimization of the reception of the transmitted access code signals. The purpose of this is to avoid an even greater number of antennas with the same frequency range. The aim is also to keep the control electronics as simple as possible. According to usage, the various antennas are typically installed at those points of the automobile at which an access authorization query and a drive authorization query are made, such as for example in the area of the doors, tailgate or ignition lock. These basic principles can essentially also be applied to the present invention.

However, a problem with the above-cited use of different antennas installed at different locations in the motor vehicle, as is the case with current PASE systems for example, is that the physically distributed antennas are associated with a high cost factor. Furthermore, very expensive and complicated cabling to each individual antenna is also required for this.

A remotely controllable access control device of this kind that has a transmit/receive device with distributed antennas of different frequency is also described in German published, non-prosecuted patent application DE 43 29 697 A1 (corresponding to U.S. Pat. No. 5,552,641).

SUMMARY OF THE INVENTION

It is accordingly an object of the invention to provide an electronic anti-theft system with correlated transmit/receive antennas which overcomes the above-mentioned disadvantages of the prior art methods and devices of this general type, which is simple and in particular as inexpensive a transmit/receive device as possible in an electronic anti-theft system.

With the foregoing and other objects in view there is provided, in accordance with the invention, a method for operating an electronic anti-theft system. The method includes performing data communication by transmitting and/or receiving electromagnetic access code signals via at least two transmit/receive antennas. The data communication of the access code signals takes place in a first permitted frequency band and also in at least a second permitted frequency band being different from the first permitted frequency band. The transmission and/or reception of the access code signals is correlated for signaling purposes. The data communication of the access code signals is performed at least partially via shared signal paths in the transmit/receive antennas. A frequency decoupling of the access code signals is further performed.

The idea on which the present invention is based on that in contrast to known solutions the differently embodied transmit/receive antennas of the anti-theft system are not driven in isolation from one another. Rather, the data communication of the access code signals which takes place in a first permitted frequency band as well as in at least a second frequency band that is different therefrom is now correlated for signaling purposes. A particular permitted frequency band can also have different frequencies provided these do not exceed the limits of the frequency band. Furthermore the data communication of the access code signals takes place at least in part via shared signal paths within the transmit/receive antennas. There is therefore an interaction present between the transmit/receive antennas and hence between the signals transmitted or received by them which enables the shared use of system resources of the anti-theft system. This is achieved according to the invention by an at least partially constructional integration of at least a part of the two transmit/receive antennas. In this way, by saving connecting leads, antenna components and other components, a substantial simplification of the system and consequently simultaneously also a cost optimization can be achieved. Moreover it may also be possible to achieve a functional optimization on account of additional interaction effects.

In this case the first permitted frequency band typically designates an LF frequency band and the second permitted frequency band designates an HF frequency band, in particular a UHF frequency band.

A special development of the method according to the invention provides that the data communication of the access code signals takes place at least partially via shared signal paths and that in addition a frequency decoupling of the access code signals is performed. Thus, signal paths can advantageously be shared and the number of signal paths required reduced as a result. A possibly interfering mutual influencing of access code signals with frequencies in a different frequency band is avoided by the frequency decoupling provided. Thus, even with shared use of signal paths an interference-free operation of the anti-theft system is guaranteed with use of the frequencies of all the different frequency bands.

The anti-theft system according to the invention can be developed in particular such that at least a first transmit/receive antenna and at least a second transmit/receive antenna, that is to say transmit/receive antennas, which are configured for different frequency bands are connected to a shared signal path via an electrical coupling circuit. This in turn results in the advantage that signal paths are shared and consequently the number of necessary signal paths can be reduced. The coupling circuit provided between the first and second transmit/receive antenna fulfills in particular the purpose of a decoupling of access code signals of different frequency bands, that is to say the coupling circuit serves for the frequency decoupling of the access code signals. Toward that end it can be provided in particular that the electrical coupling circuit is embodied as a coupling network with low-pass characteristic or band-pass characteristic.

The aforementioned measures serve in particular for signaling or, as the case may be, electrical integration of the different transmit/receive antennas or their signal paths. However, an even more extensive optimization of the anti-theft system according to the invention can be achieved by an at least partially constructional integration of at least a part of the different transmit/receive antennas. This can be realized in particular in that at least a first and a second transmit/receive antenna—that is to say once again transmit/receive antennas of different frequency bands—are integrated onto a common carrier element. This produces substantial structural simplifications, which is relevant in particular for installation of the transmit/receive antennas in mounting spaces with limited dimensions, such as for example in an ignition lock, a door handle or an exterior mirror.

The transmit/receive antennas of the anti-theft system can be embodied as known from the prior art referred to at the beginning. It is, however, preferable for the first transmit/receive antenna to be embodied as an LF antenna containing a coil with a transformer laminated core. The second transmit/receive antenna is preferably embodied as an HF antenna and in particular as a UHF antenna containing a printed circuit board. In this case in particular the printed circuit board itself can be used as an HF antenna. For manufacturing reasons a measure of this kind can be implemented particularly easily and therefore advantageously.

Other features which are considered as characteristic for the invention are set forth in the appended claims.

Although the invention is illustrated and described herein as embodied in an electronic anti-theft system with correlated transmit/receive antennas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
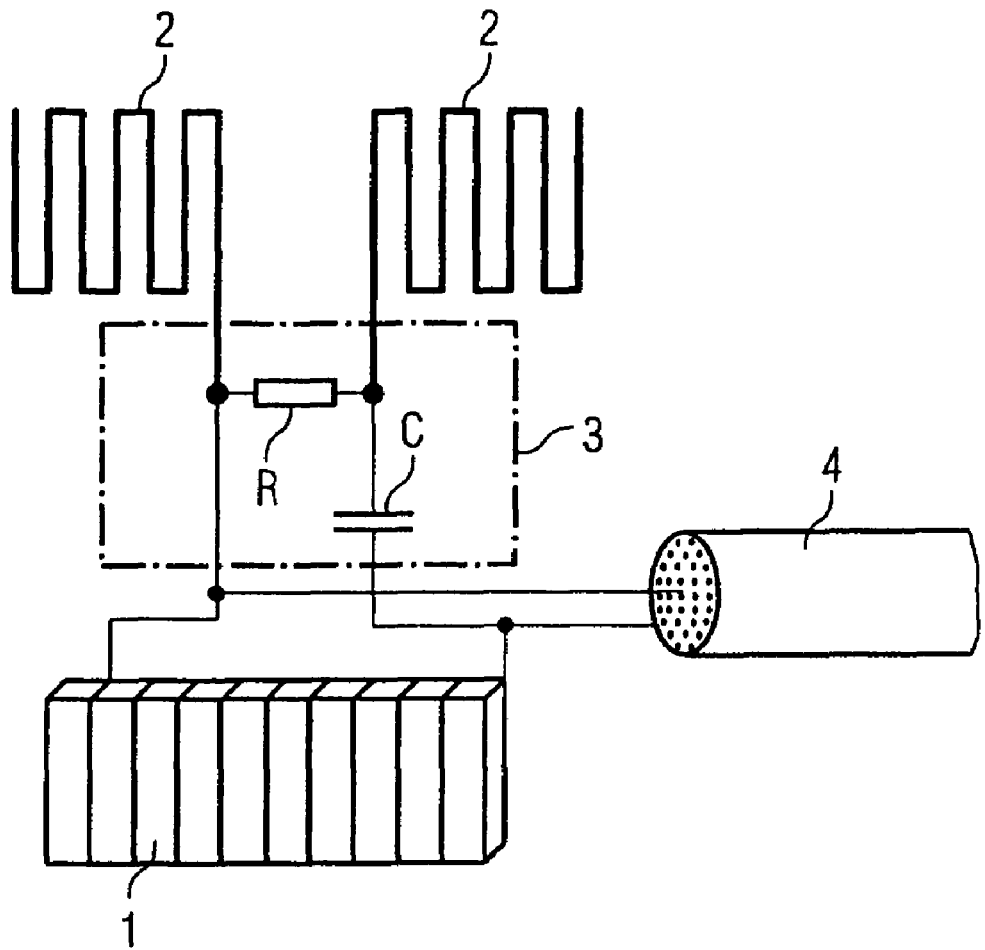
FIG. 1 is a schematic electrical circuit containing two transmit/receive antennas of an anti-theft system according to the invention.

Unless stated otherwise, identical or functionally identical elements and signals are provided with the same reference symbols in the figures of the drawing.

Referring now to the figures of the drawing in detail and first, particularly, to FIG. 1 thereof, there is shown a schematic representation of the electrical circuit connecting two transmit/receive antennas 1, 2 of an anti-theft system according to the invention. The system is provided for installation in a vehicle and can be used to transmit access queries and/or drive authorization queries in the form of electromagnetic access code signals to a mobile transponder or receive corresponding access code signals from such a transponder.

In this configuration a first transmit/receive antenna 1 is provided which is embodied as an LF antenna for a frequency range (first frequency band) of 50-125 kHz. The antenna 1 can be implemented in the form of a coil with ferrite core or transformer sheet.

Also provided is a second transmit/receive antenna 2 that is embodied as a UHF antenna for a frequency range (second frequency band) of 300-900 MHz. The antenna 2 can be embodied as a dipole antenna. A rod antenna or a loop antenna can also be used as a UHF antenna 2. However, with a loop antenna of the kind, the antenna component describes a closed loop.

The transmit/receive antennas 1, 2 are connected for signaling purposes via an electrical coupling circuit 3 in the form of a coupling network. In the example in FIG. 1 the coupling network is embodied as an RC element, that is to say it has at least one resistive element and at least one capacitive element. The coupling network 3 is used for the frequency decoupling of the transmit/receive antennas 1, 2, that is to say a separation of the frequency bands of the transmit/receive antennas 1, 2 is effected. This is necessary because the signals transmitted or received via the transmit/receive antennas 1, 2 are forwarded via a common connecting lead 4 as the signal path from or, as the case may be, to a non-illustrated control device. A coaxial cable for example, is chosen as the connecting lead 4. In the simplest case a network with low-pass or band-pass characteristic is provided as the coupling network 3 in order to be able to separate the individual frequency bands from one another in a defined manner. Owing to the very different frequency bands of, for example, the LF antenna 1 and the UHF antenna 2, frequency decoupling is very easy to implement.

Figure 2:
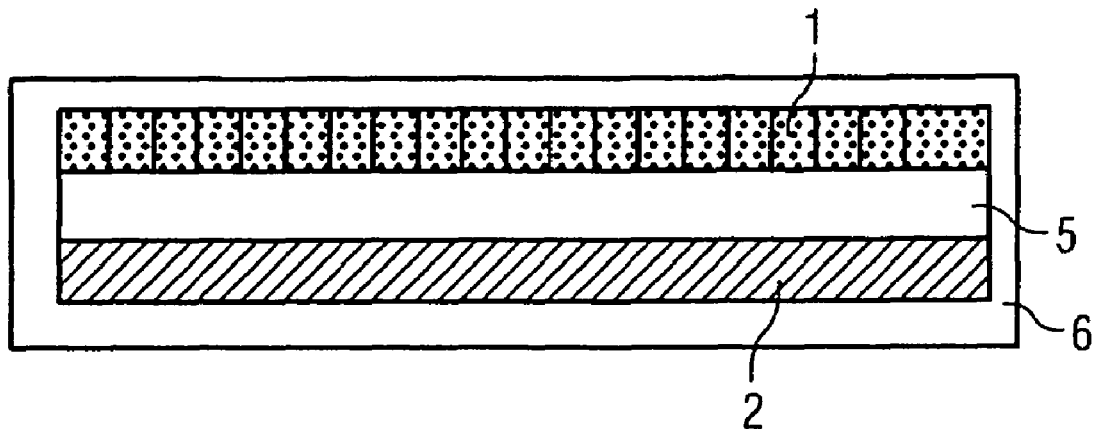
FIG. 2 is an illustration showing a special structural configuration of two transmit/receiving antennas of an anti-theft system according to FIG. 1.

FIG. 2 shows a special form of implementation of the common transmit/receive antennas 1, 2. In the example shown in FIG. 2, these are integrated on a common carrier element 6 such as a printed circuit board or wiring card, for example. In this configuration, the LF antenna 1 is embodied as a coil that can have in particular a transformer laminated core. The UHF antenna 2 is preferably implemented by a conductive layer on the printed circuit board 6. A spacer 5 that is embodied as an insulator dielectric is disposed between LF antenna 1 and UHF antenna 2.

Not shown in FIG. 2 is the connection of the common connecting lead 4 and the coupling network 3. The coupling network 3 is preferably also disposed on the carrier element 6. In this configuration the coupling network 3 can be constructed discretely, for example by individual discrete components that are soldered on the carrier board 6. Alternatively the coupling network 3 can also be mounted directly on the carrier element 6 as a conductive layer which represents the resistors, capacitors and associated interconnect lines. Alternatively the coupling network 3 can also be embodied in the form of an integrated circuit or be part of an integrated circuit which is mounted accordingly, for example by soldering, onto the carrier element 6.

Although the present invention has been described hereinabove with reference to a preferred exemplary embodiment, it is not restricted thereto but can be modified in a multiplicity of different ways.

Thus, for example, instead of only two transmit/receive antennas with different frequency bands, more than two transmit/receive antennas with different frequency bands may also be provided. Accordingly, for example, a plurality of UHF antennas may also be provided. These allow an improved pinpointing of the location of a transponder, in particular in the case of multipath propagation, and a better signal-to-noise ratio. For example, 4 to 8 LF antennas and 1 to 4 UHF antennas can be used, each of which can be disposed at different, suitable positions in the vehicle, as already explained at the beginning. Other types of suitable antenna configurations than the embodiments described here in an exemplary manner can also be used. Similarly, other common carrier elements can also be used to realize a structural integration of two or more transmit/receive antennas. Thus, in particular also a transmit/receive antenna itself can be used as the carrier element for further transmit/receive antennas.

This application claims the priority, under 35 U.S.C. § 119, of German patent application No. 10 2004 038 837.7, filed Aug. 10, 2004; the entire disclosure of the prior application is herewith incorporated by reference.

I claim:

1. A method for operating an electronic anti-theft system, which comprises the steps of:
    performing data communication by transmitting and/or receiving electromagnetic access code signals via at least two transmit/receive antennas, the data communication of the access code signals takes place in a first permitted frequency band and also in at least a second permitted frequency band being different from the first permitted frequency band;
    correlating the transmission and/or reception of the access code signals for signaling purposes;
    performing the data communication of the access code signals at least partially via shared signal paths in the transmit/receive antennas; and
    performing a frequency decoupling of the access code signals.

2. The method according to claim 1, wherein the first permitted frequency band designates an LF frequency band and the second permitted frequency band designates an HF frequency band.

3. An electronic anti-theft system, comprising:
    at least two transmit/receive antennas for transmitting and/or receiving electromagnetic access code signals for performing data communication, said at least two transmit/receive antennas include at least a first transmit/receive antenna for data communication of said access code signals in a first frequency band, and at least a second transmit/receive antenna for data communication of said access code signals in a second frequency band being different from the first frequency band, said at least two transmit/receive antennas beinci conficiured to perform the data communications of the access code sicinals at least partially via shared oaths of said at least two transmit/receive antennas, and an at least partially constructional integration of at least a part of said two transmit/receive antennas, the data communication of access code signals taking place in said first frequency band and also in said second frequency band.

4. The anti-theft system according to claim 3, further comprising an electrical coupling circuit, said first transmit/receive antenna and said second transmit/receive antenna are connected to a shared signal path through said electrical coupling circuit.

5. The anti-theft system according to claim 4, wherein said electrical coupling circuit is a coupling network with a characteristic selected from the group consisting of a low-pass characteristic and a band-pass characteristic.

6. The anti-theft system according to claim 3, wherein said first and said second transmit/receive antenna are connected to each other for signaling purposes.

7. The anti-theft system according to claim 3, further comprising a common carrier element, said first transmit/receive antenna and said second transmit/receive antenna are integrated on said common carrier element.

8. The anti-theft system according to claim 3, wherein said first transmit/receive antenna is an LF antenna having a coil with a transformer laminated core or ferrite core, for transmitting and/or receiving LF frequencies.

9. The anti-theft system according to claim 3, wherein said second transmit/receive antenna is an HF antenna having a printed circuit board, for transmitting and/or receiving HF frequencies.

10. The anti-theft system according to claim 3, wherein said common carrier element is a printed circuit board.

11. The anti-theft system according to claim 3, wherein said at least two transmit/receive antennas are configured to perform a frequency decoupling of the access code signals.

* * * * *